United States Patent [19]

Kuromoto

[11] Patent Number: 4,468,162

[45] Date of Patent: Aug. 28, 1984

[54] CONTROL MEANS FOR A MECHANICAL FINGER CLAMP

[75] Inventor: Kazunori Kuromoto, Komatsu, Japan

[73] Assignee: Kabushiki Kaisha Komatsu Seisakusho, Tokyo, Japan

[21] Appl. No.: 451,802

[22] Filed: Dec. 21, 1982

[30] Foreign Application Priority Data

Dec. 23, 1981 [JP] Japan .................................. 56-190900

[51] Int. Cl.$^3$ .............................................. B25J 3/00
[52] U.S. Cl. .......................................... 414/4; 414/1; 414/909
[58] Field of Search ........................... 414/1, 2, 4, 5, 6; 901/3, 4

[56] References Cited

U.S. PATENT DOCUMENTS 3,165,345  1/1965  Gardner ................................ 294/67
3,171,549  3/1965  Orloff .................................. 414/4 X
3,897,805  8/1975  Casey .................................. 137/637
4,302,138  11/1981  Zarudiansky ......................... 414/5

Primary Examiner—Robert J. Spar
Assistant Examiner—Donald W. Underwood
Attorney, Agent, or Firm—Armstrong, Nikaido, Marmelstein & Kubovcik

[57] ABSTRACT

A control lever structure for a mechanical finger clamp having a grip and first and second members projecting therefrom in opposite directions from each other. The mechanical finger clamp comprises a mounting member, and a plurality of articulate fingers pivotally connected to the mounting member, each articulate finger having a base portion and a leading end portion pivotally connected to the base portion. Pivotal movements of the articulate fingers are caused by hydraulic cylinders. A plurality of switches are mounted on the grip and the first and second members for selectively operating the hydraulic cylinders via solenoid-operated control valves. The arrangement of the plurality of switches is such that the movements of operator's fingers for operating the switches are similar to the movements of the articulate fingers.

3 Claims, 7 Drawing Figures

CONTROL MEANS FOR A MECHANICAL FINGER CLAMP

BACKGROUND OF THE INVENTION

This invention relates to a control means for a mechanical finger clamp adapted to clamp and unclamp an article by means of a pair of clamp claws which can be swung by the action of cylinders associated therewith.

In general, the mechanical finger clamp which has so far been employed comprises first hydraulic cylinders arranged to fold clamp claws and second cylinders arranged to open and close or swing outwardly and inwardly the clamp claws per se relative to the clamp body, and so it comprises at least four hydraulic cylinders.

For this reason, in operating a mechanical finger clamp thus constructed, it is required to operate four change-over valves adapted to control the supply of pressurized fluid into the four cylinders. Therefore, four control levers must be operated, and so the operation per se is very troublesome.

SUMMARY OF THE INVENTION

It is therefore an object of the present invention to provide an improved control means for a mechanical finger clamp which overcomes the above noted problems of the prior art.

Another object of the present invention is to provide a control lever structure which is simple and compact and can be operable by a single hand.

A further object of the present invention is to provide a control lever structure having a plurality of switches mounted thereon, the arrangement being such that the movements of operator's fingers for operating the switches are similar to the movements of the articulate fingers.

In accordance with an aspect of the present invention, there is provided a control means for a mechanical finger clamp, said finger clamp including mounting means, a plurality of articulate fingers connected to the mounting means for pivotal motion, each articulate finger having a first segment pivotally connected to the mounting means and a second segment connected to the first segment for pivotal motion, first means for pivotally moving the first segments of the articulate fingers relative to the mounting means, second means for pivotally moving the second segments of the articulate fingers relative to the first segments said control means comprising: a control lever for said mechanical finger clamp, said control lever having a grip formed at one end thereof; a first member prejecting from said control lever in a predetermined direction for defining a first spacing between the same and said grip; a second member projecting from said control lever in the opposite direction for defining a second spacing between the same and said grip; a source of pressurized fluid; a plurality of solenoid-operated control valves for selectively supplying pressurized fluid from said source to said first and second means; a first switch mounted on one end face of said grip; a second switch mounted on said one end face of said grip downwardly spaced from said first switch; a third switch mounted on the opposite end face of said grip; a fourth switch mounted on the opposite end face of said grip downwardly spaced from said third switch; a fifth switch mounted on said first member opposite said first switch; a sixth switch mounted on said first member opposite said second switch; a seventh switch mounted on said second member opposite said third switch; and an eight switch mounted on said second member opposite said fourth switch; said first and third switches being adapted to operate said solenoid-operated control valves in such a way that said first means is actuated to move said first segments towards each other, said second and fourth switches being adapted to operate said solenoid-operated control valves in such a way that said second means is actuated to move said second segments towards each other, said fifth and seventh switches being adapted to operate said solenoid-operated control valves in such a way that said first means is actuated to move said first segments away from each other, and said sixth and eighth switches being adapted to operate said solenoid-operated control valves in such a way that said second means is actuated to move said second segments away from each other.

The above and other objects, features and advantages of the present invention will be readily apparent from the following description taken in conjunction with the accompanying drawings.

DESCRIPTION OF THE PREFERRED EMBODIMENT

The present invention will now be described by way of example only with reference to the accompanying drawings.

Figure 1:
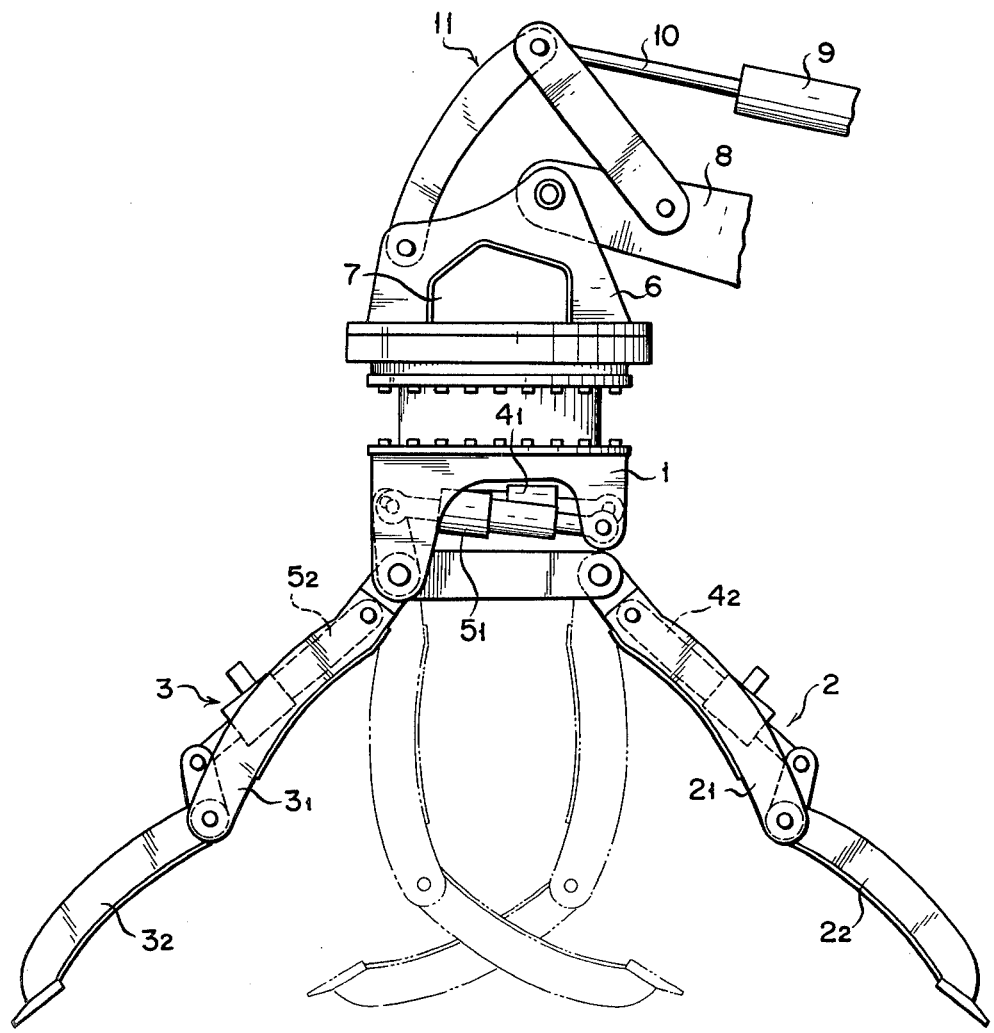
FIG. 1 is a front elevational view of a mechanical finger clamp to be controlled by a control means according to the present invention.
Figure 2:
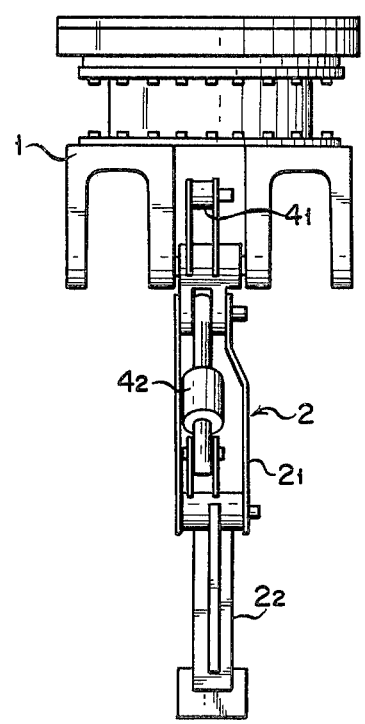
FIG. 2 is a right side elevational view thereof.
Figure 3:
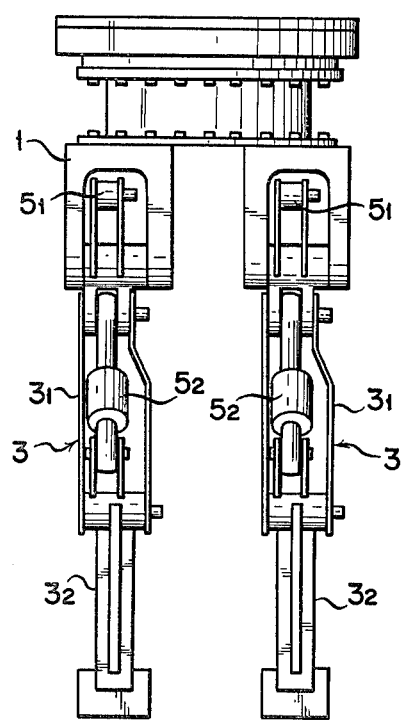
FIG. 3 is a left side elevational view thereof.

FIG. 1 is a front view of a mechanical finger clamp; and FIGS. 2 and 3 are right and left side elevational views, respectively, of the mechanical finger clamp shown in FIG. 1.

The mechanical finger clamp comprises a body 1 provided with a clamp claw 2 on one side thereof and a pair of clamp claws 3, 3 on the other or opposite side thereof, the clamp claws 2, 3, 3 each being arranged to extend and retract its leg freely.

The clamp claws 2, 3, 3 each comprises base end portions $2_1$, $3_1$, $3_1$, respectively, and leading end portions $2_2$, $3_2$, $3_2$ pivotally connected to the base end portions $2_1$, $3_1$, $3_1$, respectively. The base end portions $2_1$, $3_1$, $3_1$ can be swung by the action of first cylinders $4_1$, $5_1$, $5_1$, respectively whilst the leading end portions $2_2$, $3_2$, $3_2$ can be swung by the action of second cylinders $4_2$, $5_2$, $5_2$, respectively.

The body 1 is rotatably mounted on a mount 6 and can be rotated by a turning motor 7. The mount 6 is connected to an arm 8 so as to be pivoted in the vertical direction, the arm 8 being in turn mounted on the vehicle body not shown so that it may be pivoted in the vertical direction.

Connected to the mount 6 through a link 11 is a piston rod 10 of a cylinder 9 which is pivotally connected to the arm 8.

Figure 4:
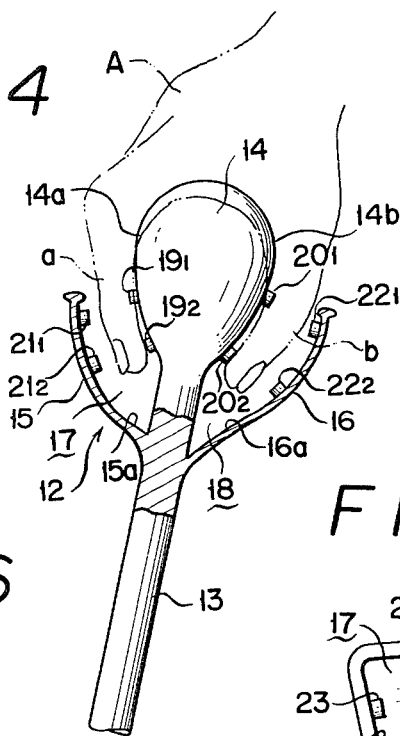
FIG. 4 is a longitudinal sectional view of a control lever for operating the mechanical finger clamp showing various switches mounted on the head end thereof.
Figure 5:
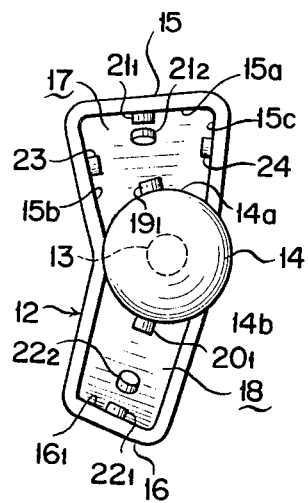
FIG. 5 is a plan view thereof.

FIG. 4 is a longitudinal sectional view of a control lever 12, and FIG. 5 is a plan view of the same. The control lever 12 comprises a rod 13 whose upper part includes a grip portion 14 and first and second members 15 and 16 extending from both sides of it and formed as an integral part thereof thus forming spacings 17 and 18.

The grip portion 14 has first upper and lower switches $19_1$ and $19_2$ and second upper lower switches $20_1$ and $20_2$ fitted to its side faces $14a$ and $14b$, respectively, the switches $19_2$ and $20_2$ being longitudinally spaced from the switches $19_1$ and $20_1$, respectively. Further, the first and second members 15 and 16 have third upper and lower switches $21_1$ and $21_2$ and fourth upper and lower switches $22_1$ and $22_2$ fitted to the opposite faces $15a$ and $16a$, respectively, the switches $21_2$ and $22_2$ being longitudinally spaced from the switches $21_1$ and $22_1$, respectively. Further, fifth and sixth switches 23 and 24 are fitted to the left and right portions $15b$ and $15c$, respectively, of the first member 15.

Figure 6:
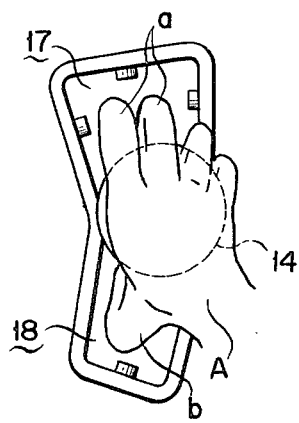
FIG. 6 is a schematic representation showing how the control lever is grasped by fingers.

In operation, the operator holds the grip portion 14 by his hand "A" with two fingers "a" extending into the first space 17 and with thumb "b" into the second space 18 as shown in FIGS. 4 and 6.

Figure 7:
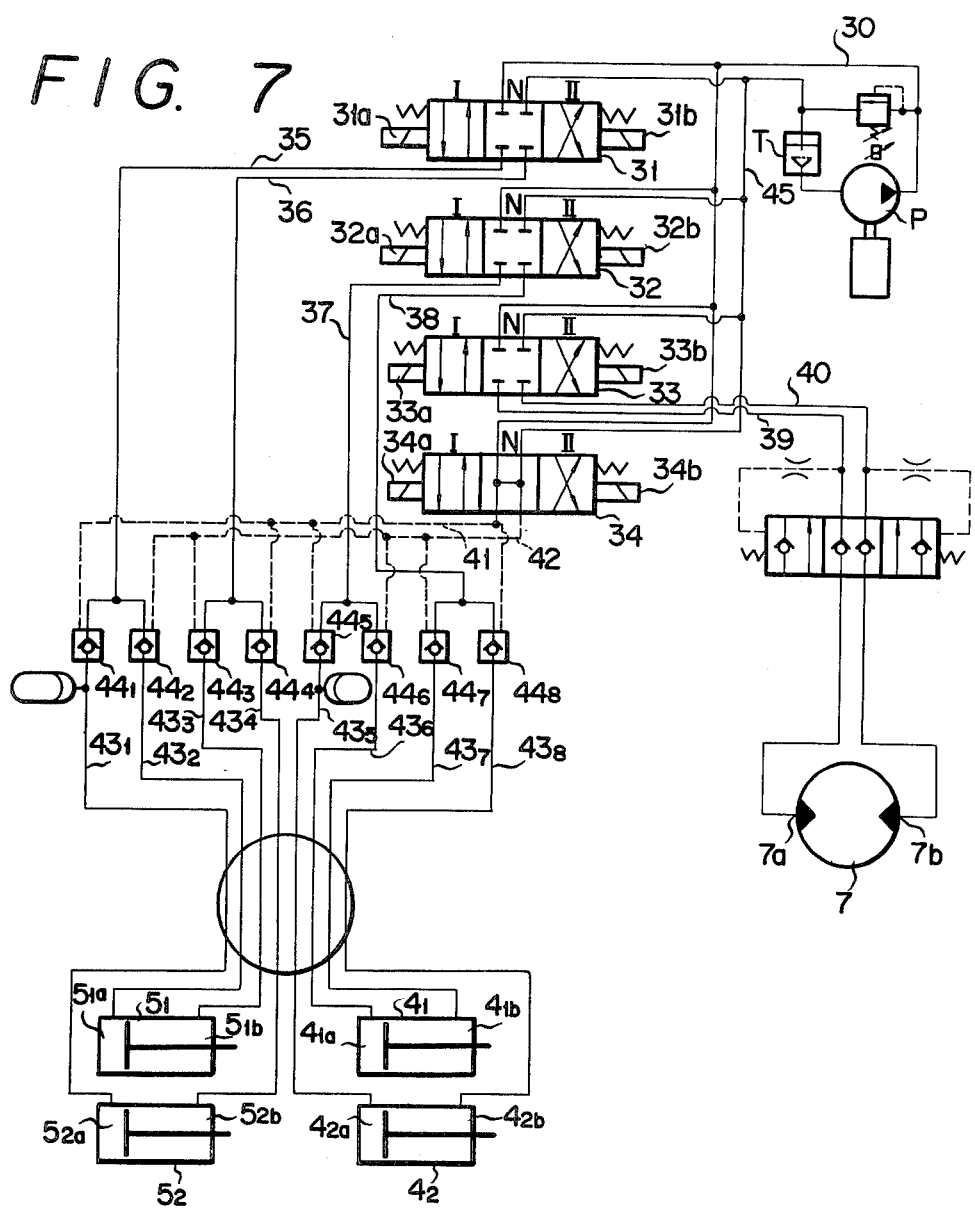
FIG. 7 is a hydraulic circuit of the control system.

FIG. 7 shows a hydraulic circuit employed for the mechanical clamp finger. Connected in parallel with a conduit 30 in which fluid under pressure is supplied by a hydraulic pump p are first, second, third and fourth solenoid-operated valves 31, 32, 33 and 34. The first solenoid-operated valve 31 supplies pressurized fluid into first and second conduits 35 and 36, the second solenoid-operated valve 32 supplies pressurized fluid into third and fourth conduits 37 and 38, and the third solenoid-operated valve 33 supplies pressurized fluid into fifth and sixth conduits 39 and 40. The fourth solenoid-operated valve 34 is arranged to supply pilot fluid into first and second pilot pressure conduits 41 and 42. The first conduit 35 is connected through first and second auxiliary conduits $43_1$ and $43_2$ with head end chambers $51_a$ and $52_a$ of first and second cylinders $5_1$ and $5_2$, respectively. In the similar manner, the second conduit 36 is connected through third and fourth auxiliary conduits $43_3$ and $43_4$ with rod end chambers $51_b$ and $52_b$ of the hydraulic cylinders $5_1$ and $5_2$, respectively; the third conduits 37 is connected through fifth and sixth auxiliary conduits $43_5$ and $43_6$ with head end chambers $42_a$ and $41_a$ of the cylinders $4_2$ and $4_1$, respectively; and the fourth conduits 38 is connected through seventh and eighth auxiliary conduits $43_7$ and $43_8$ with rod end chambers $41_b$ and $42_b$ of the hydraulic cylinders $4_1$ and $4_2$, respectively. Further, the fifth and sixth conduits 39 and 40 are connected with a port $7a$ for forward rotation and a port $7b$ for reverse rotation of the motor 7.

The auxiliary conduits $43_1$ to $43_8$ are each provided with first to eighth pilot-operated check valves $44_1$ to $44_8$, respectively. The pilot-operated check valves $44_1$ to $44_8$ serve to prevent the flow of fluid back into a tank T and are arranged, when a pilot pressure is supplied, to permit the flow of fluid into the tank T.

The pilot pressure is supplied from the first pilot pressure conduit 41 into the first, fourth, fifth and eighth pilot-operated check valves $44_1$, $44_4$, $44_5$ and $44_8$, respectively. Further, the pilot pressure is supplied from the second pilot pressure conduit 42 into the second, third, sixth and seventh pilot-operated check valves $44_2$, $44_3$, $44_6$, $44_7$, respectively.

The operation of the mechanical finger clamp of the present invention will now be described below.

(1) When the control lever 12 is not operated, the solenoid-operated valves 31, 32, 33 and 34 are located at their neutral positions N.

Since the fourth solenoid-operated valve 34 is located at its neutral position N, the conduit 30 in which pressurized fluid is supplied from the hydraulic pump P is connected with a drain conduit 45 so that the hydraulic cylinders 4 and 5 cannot be actuated.

(2) When the operator bends inwards the leading ends of his two fingers "a" and thumb "b" to push on the first lower switch $19_2$ and the second lower switch $20_2$, first solenoids $31a$, $32a$ and $34a$ of the first, second and fourth solenoid-operated valves 31, 32 and 34, respectively, will be energized to shift the respective valves to their first offset positions I.

As a result, the pressurized fluid delivered by the hydraulic pump P is supplied through the first conduit 35 and the first auxiliary conduit $43_1$ into the head end chambers $52_a$ of the second hydraulic cylinders $5_2$, and in the similar manner the fluid under pressure from the pump P is supplied through the third conduit 37 and the fifth auxiliary conduit $43_5$ into the head end chamber $42_a$ of the second hydraulic cylinder $4_2$. Further, the pressurized fluid is supplied as a pilot pressure through the first pilot pressure conduit 41 into the first, fourth, fifth and eighth pilot-operated check valves $44_1$, $44_4$, $44_5$ and $44_8$, respectively. As a result, the rod end chambers $52_b$ and $42_b$ of the hydraulic cylinders $5_2$ and $4_2$, respectively, are connected through the fourth and eigth auxiliary conduits $43_4$ and $43_8$, the fourth and eighth pilot-operated check valves $44_4$ and $44_8$ and the second and fourth conduits 36 and 38, respectively, with the drain conduit 45.

Consequently, the piston rod of the second hydraulic cylinder $4_2$ on one side and the piston rods of the second hydraulic cylinders $5_2$ on the other side will extend so that the leading end portion $2_2$ of the clamp claws 2 on one side and the leading end portions $3_2$ of the clamp claws 3 on the other side may turn inwardly towards each other.

Then, the pressurized fluid is supplied through the second and sixth auxiliary conduits $43_2$ and $43_6$, into the head end chambers $51_a$ and $41_a$ of the first hydraulic cylinders $5_1$ and the first hydraulic cylinder $4_1$, respectively. Whilst, the third and seven pilot-operated check valves $44_3$ and $44_7$ installed in the third and seventh auxiliary conduits $43_3$ and $43_7$ connected with the rod end chambers $51_b$ and $41_b$, respectively, are not supplied with the pilot pressure and therefore prevent the flow of fluid back into the tank so that the pistons of both the first hydraulic cylinders $5_1$ and the first hydraulic cylinder $4_1$ remain inoperative.

(3) When the operator bends inwards the base portions of his two fingers "a" and thumb "b" to push on the first upper switch $19_1$ and the second upper switch $20_1$, the solenoid-operated valves 31 and 32 will assume their first positions I in the same manner as mentioned hereinbefore, and the fourth solenoid-operated valve 34 will assume its second position II because of its second solenoid $34b$ being energized. Therefore, the pressurized fluid delivered by the hydraulic pump P is supplied as a pilot pressure through the second pilot conduit 42 into the second, third, sixth and seventh pilot-operated check valves $44_2$, $44_3$, $44_6$ and $44_7$, respectively. As a result, as in the afore-mentioned case, the piston rod of the first hydraulic cylinder $4_1$ on one side and the piston rods of the first hydraulic cylinders $5_1$ on the other side will extend so that the base end portion $2_1$ of the clamp claws 2 on one side and the base end portions $3_1$ of the clamp claws 3 on the other side may turn inwardly.

(4) When the operator bends outwards or open the leading end portions of his two fingers shown by "a" and thumb "b" to push on the third lower switch $21_2$ and the fourth lower switch $22_2$, the first and second solenoid-operated valves 31 and 32 will be located at their second offset positions II because of their second solenoids $31b$ and $32b$ being energized, and the fourth solenoid-operated valve 34 will be located at its first offset position I because of its first solenoid $34a$ being energized. Consequently, the pressurized fluid delivered by the hydraulic pump P will be supplied into the second and fourth conduits 36 and 38 and the first pilot pressure conduit 41, respectively.

For this reason, in the similar manner as in the aforementioned case (2), the piston rod of the second hydraulic cylinder $4_2$ on one side and the piston rods of the second hydraulic cylinder $5_2$ on the other side will be retracted so that both the leading end portion $2_2$ of the clamp claw 2 on one side and the leading end portion $3_2$ of the clamp claws 3 on the other side may swing outwardly (or expand).

(5) When the operator bends or open the base portions of his two fingers shown by "a" and thumb "b" to push on the third upper switch $21_1$ and the fourth upper switch $22_1$, the first, second and fourth solenoid-operated valves 31, 32 and 34 will be located at the respective second offset positions II. As a result, in the similar manner as in the aforementioned case (3), the piston rod of the first hydraulic cylinder $4_1$ on one side and the piston rods of the first hydraulic cylinders $5_1$ on the other side will be retracted so that the base end portion $2_1$ of the clamp claw 2 on one side and the base end portions $3_1$ of the clamp claws 3 on the other side may swing outwardly or open.

(6) When the operator moves his fingers "a" to the left to render the fifth switch 23 on, the third solenoid-operated valve 33 will be located at its first offset position I because of its first solenoid $33a$ being energized so that the fluid under pressure delivered by the hydraulic pump P may be supplied through the fifth conduit 39 into the port $7a$ for forward rotation of the motor 7 thereby rotating the body 1 counterclockwise.

(7) When the operator moves his fingers "a" to the right to press the sixth switch 24 on, the third solenoid-operated valve 33 will be located at its second offset position II because of its second solenoid $33b$ being energized, the pressurized fluid delivered by the hydraulic pump P will be supplied through the sixth conduit 40 into the reversing port $7b$ of the motor 7 to reversely drive the latter thus rotate the body 1 in the clockwise direction.

Thus, the clamp claws 2 and 3 can be actuated in the same direction as those of operation of the fingers "a" and "b", and therefore the mechanical finger clamp can be operated in a simple manner only by one hand of the operator.

Further, if all the switches are of touch key type which can turn its electric circuit on and off by applying a slight pressure given by the operator's fingers, then the fatigue of the operator can be remarkably relieved even though he operates the clamp for an extended period of time.

It is to be understood that the foregoing description is merely illustrative of a preferred embodiment of the invention and that the scope of the invention is not to be limited thereto, but is to be determined by the scope of the appended claims.

What is claimed is:

1. A control means for a mechanical finger clamp, said finger clamp including mounting means, a plurality of articulate fingers connected to the mounting means for pivotal motion, each articulate finger having a first segment pivotally connected to the mounting means and a second segment connected to the first segment for pivotal motion, first means for pivotally moving the first segments of the articulate fingers relative to the mounting means, second means for pivotally moving the second segments of the articulate fingers relative to the first segments, said control means comprising:
   a control lever for said mechanical finger clamp, said control lever having a grip formed at one end thereof;
   a first member projecting from said control lever in a predetermined direction for defining a first spacing between the same and said grip;
   a second member projecting from said control lever in the opposite direction for defining a second spacing between the same and said grip;
   a source of pressurized fluid;
   a plurality of solenoid-operated control valves for selectively supplying pressurized fluid from said source to said first and second means;
   a first switch mounted on one end face of said grip;
   a second switch mounted on said one end face of said grip downwardly spaced from said first switch;
   a third switch mounted on the opposite end face of said grip;
   a fourth switch mounted on the opposite end face of said grip downwardly spaced from said third switch;
   a fifth switch mounted on said first member opposite said first switch;
   a sixth switch mounted on said first member opposite said second switch;
   a seventh switch mounted on said second member opposite said third switch; and
   an eighth switch mounted on said second member opposite said fourth switch;
   said first and third switches being adapted to operate said solenoid-operated control valves in such a way that said first means is actuated to move said first segments towards each other, said second and fourth switches being adapted to operate said solenoid-operated control valves in such a way that said second means is actuated to move said second segments towards each other, said fifth and seventh switches being adapted to operate said solenoid-operated control valves in such a way that said first means is actuated to move said first segments away from each other, and said sixth and eighth switches being adapted to operate said solenoid-operated control valves in such a way that said second means is actuated to move said second segments away from each other.

2. A control means according to claim 1 wherein said first and second means are hydraulic cylinders.

3. A control means according to claim 1 further comprising motor means for revolving said mechanical finger clamp, an additional solenoid-operated control valve for supplying pressurized fluid to said motor means when operated, a ninth switch mounted on said first member at or adjacent to one of side edges thereof, said ninth switch being adapted to operate said additional valve to supply pressurized fluid to said motor means thereby rotating the same in counterclockwise direction, and a tenth switch mounted on said first member at or adjacent to the other side edge thereof, said tenth switch being adapted to operate said additional valve to supply pressurized fluid to said motor means thereby rotating the same in clockwise direction.

* * * * *